United States Patent
Yoo (10) Patent No.: US 9,225,278 B2
(45) Date of Patent: Dec. 29, 2015

(54) METHOD FOR DETERMINING PHASE ANGLE IN PHASE SHIFT TRANSFORMER FOR MEDIUM VOLTAGE INVERTER

(71) Applicant: LSIS CO., LTD., Anyang-si, Gyeonggi-do (KR)

(72) Inventor: Anno Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/318,154

(22) Filed: Jun. 27, 2014

(65) Prior Publication Data

US 2015/0042253 A1    Feb. 12, 2015

(30) Foreign Application Priority Data

Aug. 8, 2013  (KR) ........................ 10-2013-0094081

(51) Int. Cl.

| | |
|---|---|
| *H02P 27/04* | (2006.01) |
| *H02P 23/00* | (2006.01) |
| *H02P 27/14* | (2006.01) |
| *H02M 5/458* | (2006.01) |
| H02M 1/00 | (2007.01) |
| H02M 7/483 | (2007.01) |

(52) U.S. Cl.
CPC ........... *H02P 23/0081* (2013.01); *H02M 5/458* (2013.01); *H02P 27/14* (2013.01); *H02M 2001/0077* (2013.01); *H02M 2007/4835* (2013.01)

(58) Field of Classification Search
CPC .................................... H02J 1/12; H02M 5/42
USPC ........... 318/727, 800, 801, 400.01, 700, 701; 363/34, 35, 37, 40, 65, 71
See application file for complete search history.

(56) References Cited

U.S. PATENT DOCUMENTS

| | | | |
|---|---|---|---|
| 7,830,681 B2 * | 11/2010 | Abolhassani et al. | ........... 363/37 |
| 8,045,346 B2 * | 10/2011 | Abolhassani et al. | ........... 363/37 |
| 8,223,515 B2 * | 7/2012 | Abolhassani et al. | ........... 363/65 |

FOREIGN PATENT DOCUMENTS

| | | |
|---|---|---|
| JP | 10-337042 | 12/1998 |
| JP | 2008-295149 | 12/2008 |
| JP | 2010-233292 | 10/2010 |
| JP | 2013-110950 | 6/2013 |

OTHER PUBLICATIONS

Japan Patent Office Application Serial No. 2014-141342, Office Action dated Jul. 27, 2015, 5 pages.

* cited by examiner

*Primary Examiner* — Antony M Paul
(74) *Attorney, Agent, or Firm* — Lee, Hong, Degerman, Kang & Waimey (57) ABSTRACT

A method for determining phase angle in phase shift transformer for medium voltage inverter is disclosed, the method including selecting an arbitrary phase shift angle and phase angle relative to a unit power cell of the first stage, determining a phase angle displacement in consideration of the phase shift angle and the number of unit power cells connected to each phase of a motor, determining a phase angle of the unit power cell at the second stage using a phase angle of the unit power cell at the first stage, and adjusting a phase angle when the determined phase angle of the unit power cell at the second stage exceeds a predetermined phase angle.

5 Claims, 8 Drawing Sheets

METHOD FOR DETERMINING PHASE ANGLE IN PHASE SHIFT TRANSFORMER FOR MEDIUM VOLTAGE INVERTER

CROSS-REFERENCE TO RELATED APPLICATIONS

Pursuant to 35 U.S.C.§119 (a), this application claims the benefit of earlier filing date and right of priority to Korean Patent Application No. 10-2013-0094081, filed on Aug. 8, 2013, the contents of which are all hereby incorporated by reference in its entirety.

BACKGROUND OF THE DISCLOSURE

1. Field

The teachings in accordance with the exemplary embodiments of this present disclosure generally relate to a method for determining phase angle in phase shift transformer for medium voltage inverter.

2. Background

In general, a multilevel medium voltage inverter is an inverter having an input power whose rms (root mean square) value is over 600V for a line-to-line voltage, and has several stages in output phase voltage. The multilevel medium voltage inverter is generally used to drive an industrial load of large inertia ranging from several kW to several MW capacities of, for a non-limiting example, fans, pumps, compressors, tractions, hoists and conveyors.

The multilevel medium voltage inverter uses a phase shift transformer to reduce harmonics, where a phased shift angle of the phase shift transformer is determined by the number of unit power cells, and an increased number of unit power cells improve a THD (Total Harmonic Distortion) at an input terminal. However, if the number of unit power cells disadvantageously generate the THD at an input phase current.

Figure 1:
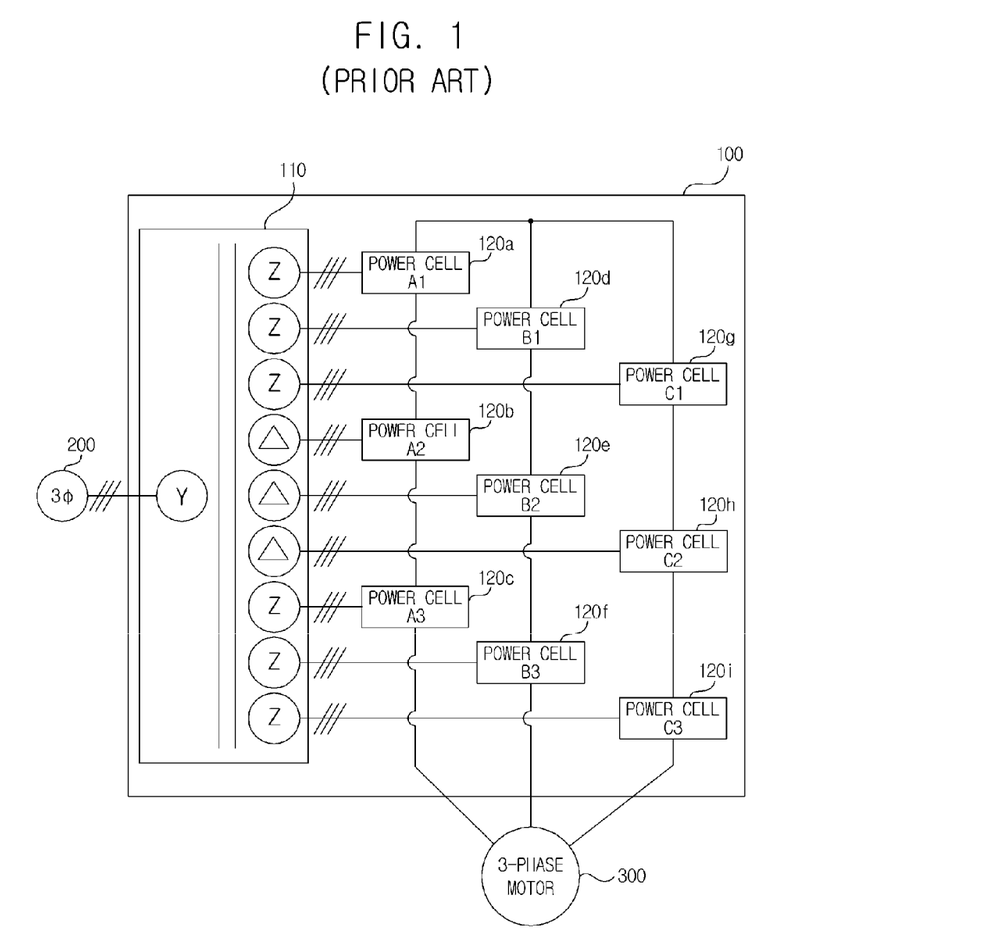
FIG. 1 is a circuit diagram illustrating a configuration of a conventional multilevel medium voltage inverter.
Figure 2:
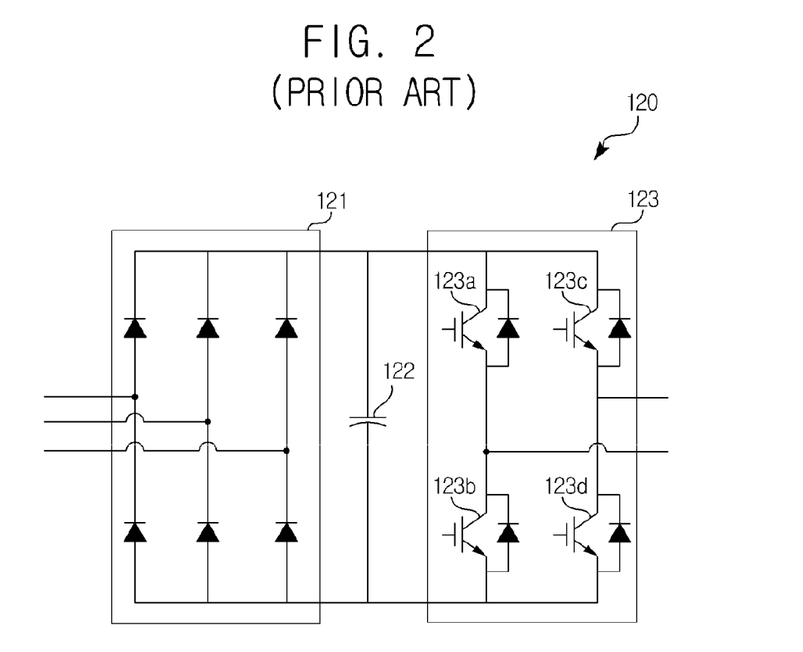
FIG. 2 is a schematic view illustrating a detailed configuration of unit power cells of FIG. 1.

FIG. 1 is a circuit diagram illustrating a configuration of a conventional multilevel medium voltage inverter, which is a schematic view illustrating a serially cascaded H-bridge multilevel inverter, and FIG. 2 is a schematic view illustrating a detailed configuration of unit power cells of FIG. 1.

A phase shift transformer (110) in a general multilevel medium inverter (100) changes phase and size of voltage in a high input power in response to requirement of a unit power cell (120). An output voltage of the phase shift transformer (110) is an input power of each unit power cell (120), and converted to a DC through a 3-phase diode rectifier (121).

Figure 3A:
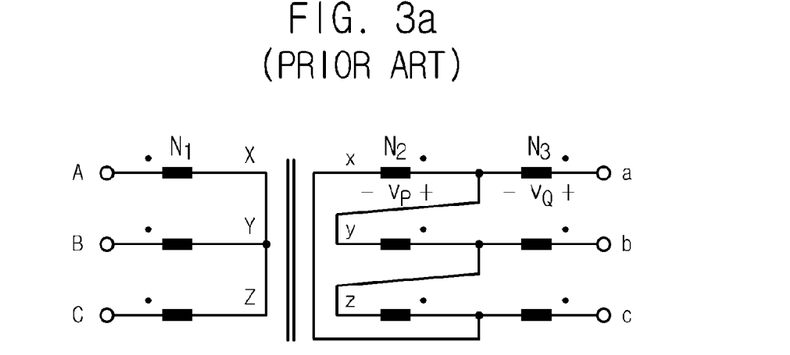
FIG. 3a is a structural view illustrating a phase shift transformer of FIG. 1.
Figure 3B:
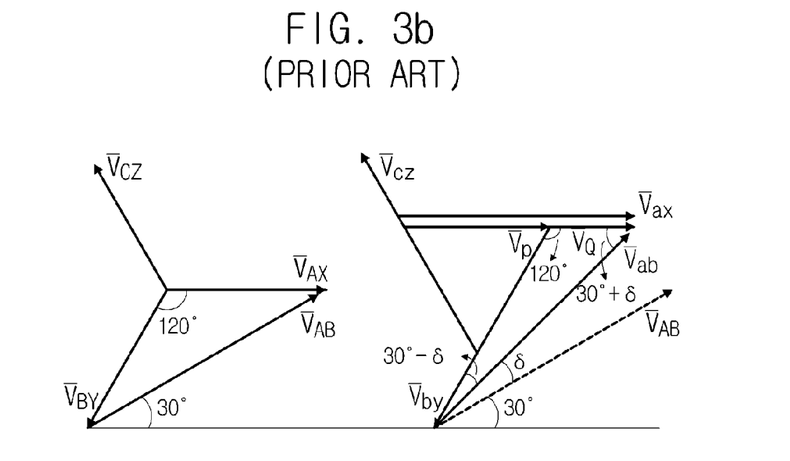
FIG. 3b is a phase diagram illustrating a phase shift transformer of FIG. 1.

FIGS. 3a and 3b illustrate a structure and a phase diagram of a phase shift transformer (110) where a phase shift angle at a secondary side is positive to a phase shift angle at a primary side (Y/Z-1), when the primary side of the phase shift transformer (110) is formed in a Y winding of $N_1$ turn, a secondary side is formed in a delta ($\Delta$) winding of $N_2$ winding, and a tertiary side is formed in a winding of $N_3$.

Figure 4A:
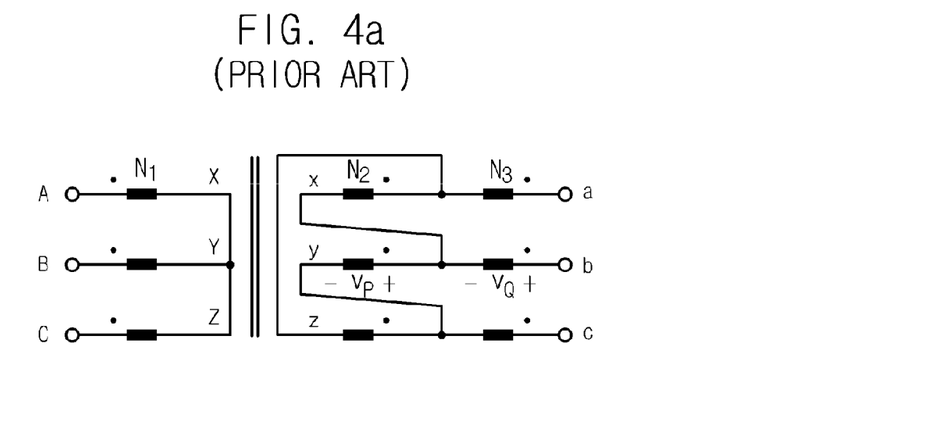
FIG. 4a is a structural view illustrating a phase shift transformer of FIG. 1.
Figure 4B:
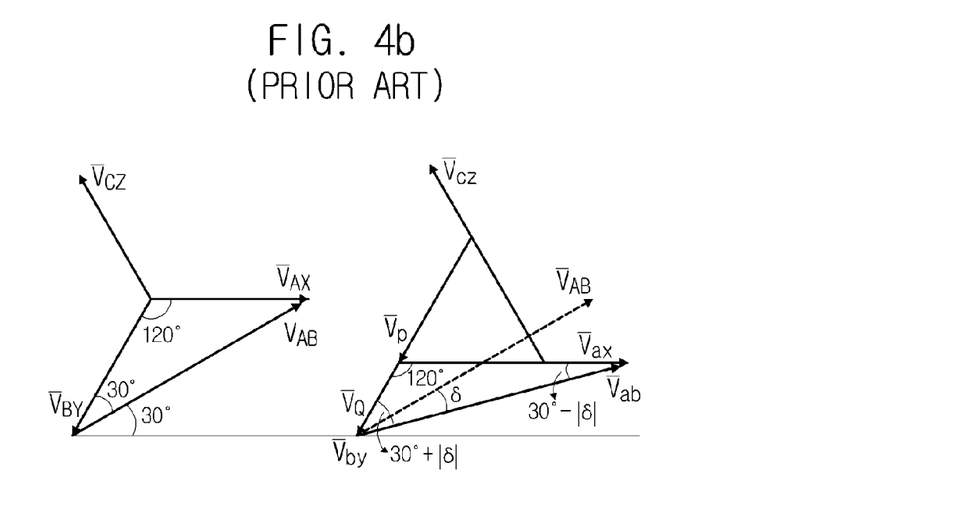
FIG. 4b is a phase diagram illustrating a phase shift transformer of FIG. 1.

Furthermore, FIGS. 4a and 4b illustrate a structure and a phase diagram of a phase shift transformer (110) where a phase shift angle at a secondary side is negative to a phase shift angle at a primary side (Y/Z-2), when the primary side of the phase shift transformer (110) is formed in a Y winding of $N_1$ turn, a secondary side is formed in a delta ($\Delta$) winding of $N_2$ winding, and a tertiary side is formed in a winding of $N_3$.

As noted from the foregoing, an phase shift angle of the phase shift transformer (110) is determined by the number of unit power cells (120), where Ax, Bx, Cx of the unit power cells (120) respectively have a same phase shift angle. An output of secondary side of the phase shift transformer corresponds to the number of the diode rectifier (121) at the unit power cell (120), and a phase shift angle of the phase shift transformer (110) may be determined by the following Equation.

$$\alpha_{sec} = \frac{360}{2N_{sec}}$$

where, unit of $\alpha_{sec}$ is i [degree], and $N_{sec}$ is the number of outputs at the secondary side of the phase shift transformer (110), or a total number of unit power cells (120). For example, $N_{sec}$ is 9, and $\alpha_{sec}$ is 20 in FIG. 1. Thus, an entire phase shift angle may be selected as 0°, 20°, −20° based on 0°.

When two unit power cells are used for each phase of a motor, $N_{sec}$ is 6 and $\alpha_{sec}$ is 30°. In this case, a phase shift angle may be selected as 0°, 30° based on 0°.

The conventional phased shift transformer thus described can output three pairs of secondary winding having a same phase shift angle, such that a problem of decreased THD in input phase current at the power side arises when the number of unit power cells for each phase of a motor is fewer than three.

This problem is caused by disability in selection of sufficiently small size of phase shift angle in the phase shift transformer (110), such that the conventional structure of phase shift transformer (110) disadvantageously generates a problem of satisfying the THD harmonics regulation at an input phase current in the system, only when more than three unit power cells for each phase of a motor are connected.

SUMMARY OF THE DISCLOSURE

The present disclosure is to provide a method for determining phase angle in phase shift transformer for medium voltage inverter configured to mitigate a THD of input phase current at a primary side of a phase shift transformer, even when the number of unit power cells connected to each phase of a motor of a multilevel medium voltage inverter is fewer than three.

In one general aspect of the present disclosure, there is provided a method for determining phase angle in phase shift transformer for medium voltage inverter, the inverter including a plurality of unit power cells formed in first and second stages, one stage formed with 3-phase unit power cells, and the plurality of unit power cells respectively connected to a phase shift transformer, the method comprising:

selecting an arbitrary phase shift angle and phase angle relative to a unit power cell of the first stage;

determining a phase angle displacement in consideration of the phase shift angle and the number of unit power cells connected to each phase of a motor;

determining a phase angle of the unit power cell at the second stage using a phase angle of the unit power cell at the first stage; and adjusting a phase angle when the determined phase angle of the unit power cell at the second stage exceeds a predetermined phase angle.

Preferably, but not necessarily, the predetermined phase angle may be 30° at the maximum.

Preferably, but not necessarily, the adjustment of the phase angle may be performed by using the following Equation.

$$X'n = \mathrm{sgn}(Xn)\frac{6|Xn| - 360}{6},$$

where X'n is an adjusted phase angle of the unit power cell, Xn is a phase angle of the unit power cell (n is positive integer), and sgn(Xn) is a function determining a sign, where when $$\frac{6|Xn| - 360}{6}$$

is positive, '1' is outputted and when $$\frac{6|Xn| - 360}{6}$$

is negative '−1' is outputted.

Preferably, but not necessarily, the phase angle displacement may be a value in which the phase shift angle of the unit power cells in the first stage is divided by the number of unit power cells connected to each phase of the motor.

Preferably, but not necessarily, the phase angle of the plurality of unit power cells may be individually determined relative to each unit power cell.

Preferably, but not necessarily, the phase angle of unit power cells at the second stage may be a value in which the phase angle of unit power cells at the first stage is added by the phase angle displacement.

Preferably, but not necessarily, the unit power cell of a tertiary stage may be further connected to the phase shift transformer, and the phase angle of the unit power cell at the tertiary stage may be a value in which the phase angle of the unit power cell at the first stage is twice added by the phase angle displacement.

Advantageous Effects of the Disclosure

The present disclosure has an advantageous effect in that a THD of input phase current at a primary side of a phase shift transformer can be mitigated, even when there is a fewer number of unit power cells connected to each phase of a motor in a multilevel medium voltage inverter.

DETAILED DESCRIPTION OF THE DISCLOSURE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Hereinafter, exemplary embodiments of the present invention will be described in detail with reference to the accompanying drawings.

Figure 5:
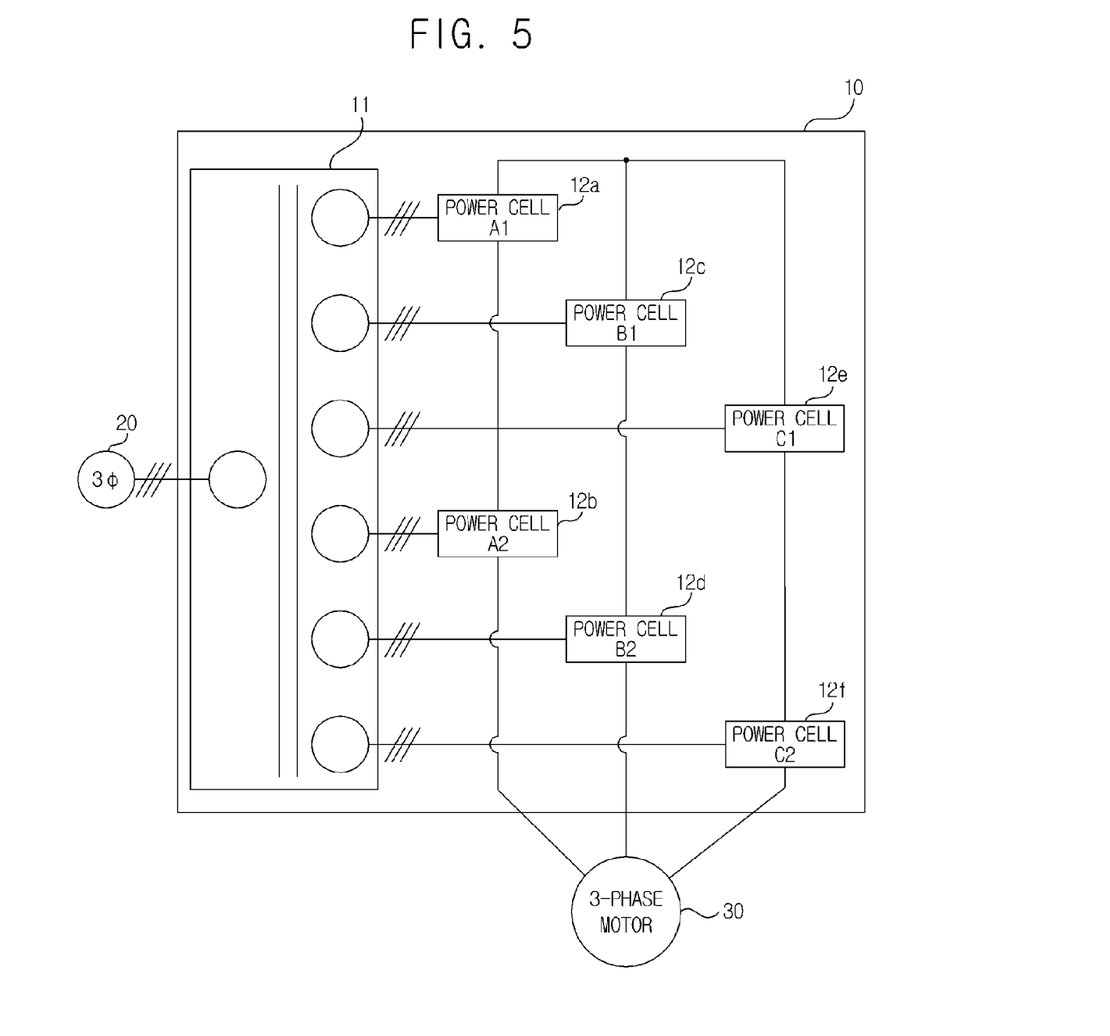
FIG. 5 is a circuit diagram illustrating a configuration of a multilevel medium voltage inverter according to the present disclosure.

FIG. 5 is a circuit diagram illustrating a configuration of a multilevel medium voltage inverter according to the present disclosure, where FIG. 5 illustrates the inverter formed with unit power cells of two stages for each phase in a motor (30).

Referring to FIG. 5, the multilevel medium voltage inverter (10) includes a phase shift transformer (11) and a plurality of unit power cells (12).

The multilevel medium inverter (10) according to the present disclosure supplies a 3-phase power to the motor (30) from an input power (20). The motor (30) is a high voltage 3-phase motor and may be an induction motor or a synchronous motor, but is not limited thereto.

The phase shift transformer (11) provides a galvanic isolation between the input power (20) and the multilevel medium voltage inverter (10), mitigates a harmonic of an input terminal, and provides an approximate 3-phase power to each unit power cell (12). A phase shift angle of the phase shift transformer (11) is determined by the number of unit power cells (12), and phase shift angles of the phase shift transformer (11) connected to each unit power cell (12) have different values from each other.

The unit power cell (12) receives a power from the phase shift transformer (11) to output a phase voltage of the motor (30), where each unit power cell (12) is comprised of three groups. As in the example of FIG. 5, A1 and A2 are serially connected to synthesize 'a' phase voltage of the motor (30), and B1 and B are serially connected to synthesize 'b' phase voltage of the motor. Furthermore C1 and C2 are serially connected to synthesize 'c' phase voltage.

The synthesized 'b' phase and 'a' phase voltages are mutually apart with a 120° phase difference, the synthesized 'c' phase and 'b' phase voltages are also mutually apart with a 120° phase difference.

Figure 6:
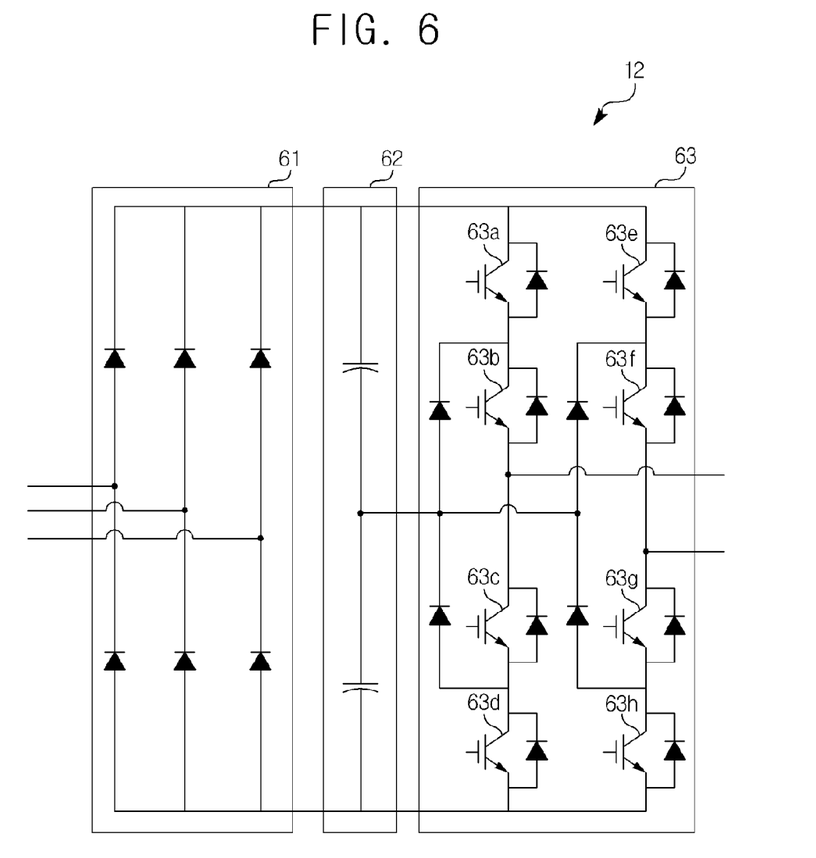
FIGS. 6 and 7 are respectively schematic views illustrating a detailed configuration of unit power cells of FIG. 5.
Figure 7:
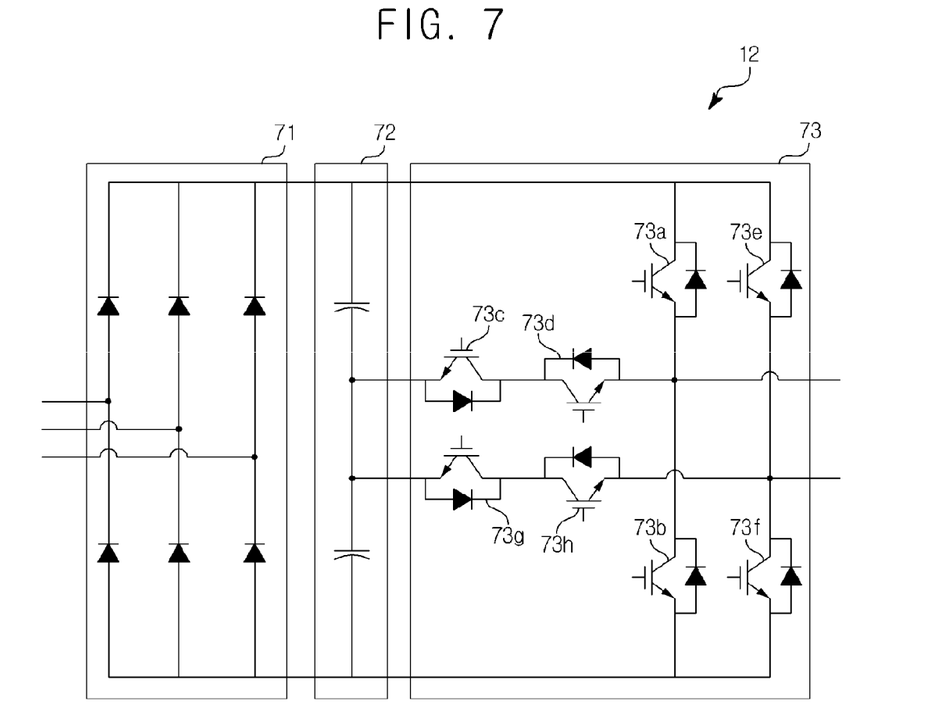

FIGS. 6 and 7 are respectively schematic views illustrating a detailed configuration of unit power cells of FIG. 5, where FIG. 6 is an example of an inverter unit (63) in full-bridge inverter configuration, and FIG. 7 is an example of an inverter unit (73) in a single phase NPC (Neutral Point Clamped) configuration.

Referring to FIGS. 6 and 7, rectifiers (61, 71) rectify a 3-phase power inputted from the phase shift transformer (11), and DC terminal capacitors (62, 72) smooth the rectified 3-phase power. The full-bridge inverter unit (63) may be configured with a 5-level unit power cell, and the single phase NPC inverter unit (73) may be also configured with a 5-level unit power cell. However, it should be apparent to the skilled in the art that configuration is not limited to the present disclosure, and therefore detailed explanation is omitted herefrom.

Determination of phase angle of the phase shift transformer (11) according to the present disclosure is performed as the method of the present invention at the time of design. Now, the determination of phase angle in the phase shift transformer will be described with reference to drawings.

Figure 8:
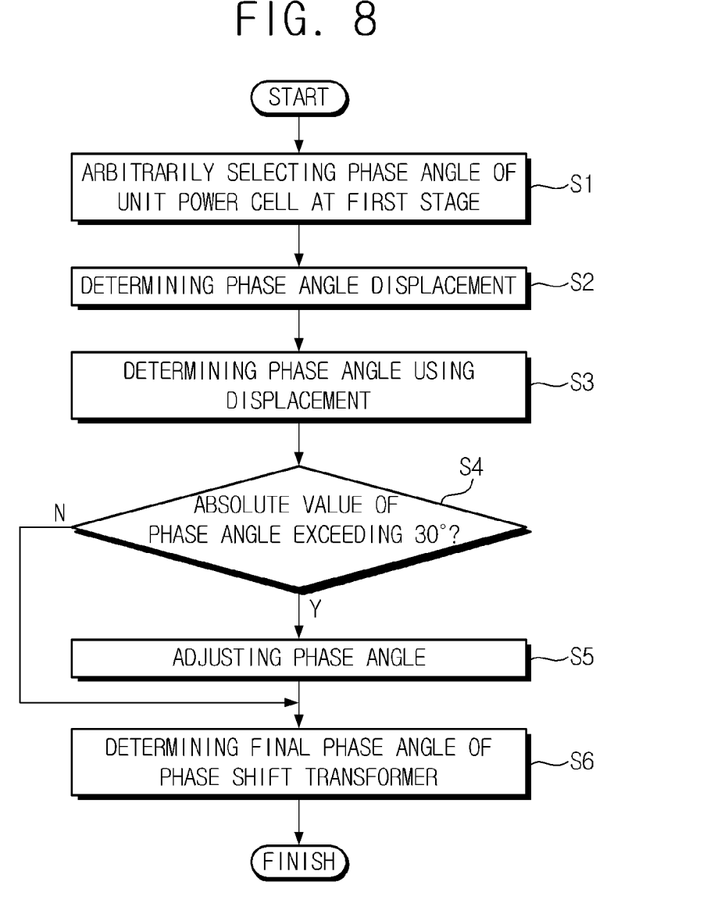
FIG. 8 is a flowchart illustrating a method for a phase angle according to an exemplary embodiment of the present disclosure.

FIG. 8 is a flowchart illustrating a method for a phase angle according to an exemplary embodiment of the present disclosure.

Referring to FIG. 8, the method of the present disclosure is such that phase angles of A1, B1 and C1, which are unit power cells (12) of first stage, are arbitrarily selected (S1). At this time, a phase shift angle may be selected as 20°, and phase angles of A1, B1 and C1 may be selected as 0°, 20° and −20°. However, the given phase shift angles are only provided as examples, and are not limited thereto, and orders of phase angles of A1, B1 and C1 may be also changed.

Next, displacement of phase angle is determined (S2). The displacement of phase angle may be determined by the following equation in consideration of the number of unit power cells connected to each phase of a motor.

$$\Delta \alpha_{sec} = \frac{20}{N_{sec\_phase}} \quad \text{[Equation 2]}$$

where, $N_{sec\_phase}$ is the number of unit power cells (12) connected for each phase of the motor (30). Referring again to FIG. 5, Nsec_phase is 2, and therefore $\Delta \alpha sec = 10°,$ from which phase angles of remaining unit power cells An, Bn and Cn (n is positive integer) may be determined by the following equations using the displacement (S3). For convenience sake, a phase angle of the unit power cell An is called An, and the same theory may be applicable to Bn and Cn.

$An = A1 + (n-1)\Delta \alpha_{sec}$ $Bn = B1 + (n-1)\Delta \alpha_{sec}$ $Cn = C1 + (n-1)\Delta \alpha_{sec}$ [Equation 3]

At this time, when an each absolute value of phase angle of An, Bn and Cn exceeds 30°, for example (S4), for example, the phase angle is adjusted (S5). That is, the phase angle may be adjusted as the following equation.

$$X'n = \text{sgn}(Xn)\frac{6|Xn| - 360}{6} \quad \text{[Equation 4]}$$

At this time, X is one of A, B and C. Furthermore, sgn(Xn) is a function determining a sign, where when $$\frac{6|Xn| - 360}{6}$$

is positive, '1' is outputted and when $$\frac{6|Xn| - 360}{6}$$

is negative '−1' is outputted.

That is, when an absolute value of phase angle of An, Bn and Cn exceeds 30° at the maximum (S4), the phase angle is adjusted (S5), and the adjusted phase angle is outputted as a final phase angle, and when an absolute value of phase angle of An, Bn and Cn does not exceed 30° at the maximum, the phase angle determined at S3 may be outputted as a final phase (S6).

The phase angle determined by the present disclosure in a medium voltage inverter as in FIG. 5 may be such that A1 is 0°, A2 10°, B1 is 20°, B2 is 30°, C1 is −20° and C2 is −10°.

Furthermore, when the number of unit power cells connected for each phase is 3 as in FIG. 1, A1 may be 0°, A2 may be 6.7°, A3 may be 13.4°, B1 may be 20°, B2 may be 26.7°, B3 may be −26.7°, C1 may be −20°, C2 may be −13.4°, and C3 may be −6.7°.

The THD of a total input phase current may be improved by applying the phase angle determined by the method according to the present disclosure, which is discussed as below:

Referring to FIG. 1 again, output voltages from the phase shift transformer (110) to power cells A1, B1 and C1 (120a, 120d, 120g) have the same phases, and the output voltages to the power cells A2, B2 and C2 (120b, 120e, 120h) have the same phases, and the output voltages to the power cells A3, B3 and C3 (120c, 120f, 120i) also have the same phases.

In this case, the 'a' phase current at the primary side of the phase shift transformer (110) is greatest at the 17th harmonic, and 'b' and 'c' currents also have the greatest at the 17th harmonic. Now, the medium voltage inverter applied with the present disclosure will be explained.

For example, 'a' phase current flowing in each of the power cells of A1, A2, B1, B2, C1, C1 in FIG. 5 may be defined by the following equations 5-10.

$$i_{aa1} = \sum_{n=1,5,7,11,13\ldots}^{\infty} I_n \sin(n\omega t) \quad \text{[Equation 5]}$$

$$i_{aa2} = \sum_{n=1,5,7,11,13\ldots}^{\infty} I_n \sin(n(\omega t + \delta_1)) \quad \text{[Equation 6]}$$

$$i_{ab1} = \sum_{n=1,5,7,11,13\ldots}^{\infty} I_n \sin\left(n(\omega t + \delta_2) - \frac{2}{3}\pi\right) \quad \text{[Equation 7]}$$

$$i_{ab2} = \sum_{n=1,5,7,11,13\ldots}^{\infty} I_n \sin\left(n(\omega t + \delta_3) - \frac{2}{3}\pi\right) \quad \text{[Equation 8]}$$

$$i_{ac1} = \sum_{n=1,5,7,11,13\ldots}^{\infty} I_n \sin\left(n(\omega t + \delta_4) + \frac{2}{3}\pi\right) \quad \text{[Equation 9]}$$

$$i_{ac2} = \sum_{n=1,5,7,11,13\ldots}^{\infty} I_n \sin\left(n(\omega t + \delta_5) + \frac{2}{3}\pi\right) \quad \text{[Equation 10]}$$

If a turn ratio between a primary side and a secondary side is assumed as 1:m, a current flowing to the primary side of the phase shift transformer (11) may be defined by the following equations 11~16.

$$i'_{aa1} = \frac{1}{m}\left(\sum_{n=1,7,13...}^{\infty} I_n \sin(n\omega t) + \sum_{n=5,11,17...}^{\infty} I_n \sin(n\omega t)\right)$$ [Equation 11]

$$i'_{aa2} = \frac{1}{m}\begin{pmatrix} \sum_{n=1,7,13...}^{\infty} I_n \sin(n(\omega t + \delta_1) - \delta_1) + \\ \sum_{n=5,11,17...}^{\infty} I_n \sin(n(\omega t + \delta_1) + \delta_1) \end{pmatrix}$$ [Equation 12]

$$= \frac{1}{m}\begin{pmatrix} \sum_{n=1,7,13...}^{\infty} I_n \sin(n\omega t + (n-1)\delta_1) + \\ \sum_{n=5,11,17...}^{\infty} I_n \sin(n\omega t + (n+1)\delta_1) \end{pmatrix}$$

$$i'_{ab1} = \frac{1}{m}\begin{pmatrix} \sum_{n=1,7,13...}^{\infty} I_n \sin(n(\omega t + \delta_2) - \delta_2) + \\ \sum_{n=5,11,17...}^{\infty} I_n \sin(n(\omega t + \delta_2) + \delta_2) \end{pmatrix}$$ [Equation 13]

$$= \frac{1}{m}\begin{pmatrix} \sum_{n=1,7,13...}^{\infty} I_n \sin(n\omega t + (n-1)\delta_2) + \\ \sum_{n=5,11,17...}^{\infty} I_n \sin(n\omega t + (n+1)\delta_2) \end{pmatrix}$$

$$i'_{ab2} = \frac{1}{m}\begin{pmatrix} \sum_{n=1,7,13...}^{\infty} I_n \sin(n(\omega t + \delta_3) - \delta_3) + \\ \sum_{n=5,11,17...}^{\infty} I_n \sin(n(\omega t + \delta_3) + \delta_3) \end{pmatrix}$$ [Equation 14]

$$= \frac{1}{m}\begin{pmatrix} \sum_{n=1,7,13...}^{\infty} I_n \sin(n\omega t + (n-1)\delta_3) + \\ \sum_{n=5,11,17...}^{\infty} I_n \sin(n\omega t + (n+1)\delta_3) \end{pmatrix}$$

$$i'_{ac1} = \frac{1}{m}\begin{pmatrix} \sum_{n=1,7,13...}^{\infty} I_n \sin(n(\omega t + \delta_4) - \delta_4) + \\ \sum_{n=5,11,17...}^{\infty} I_n \sin(n(\omega t + \delta_4) + \delta_4) \end{pmatrix}$$ [Equation 15]

$$= \frac{1}{m}\begin{pmatrix} \sum_{n=1,7,13...}^{\infty} I_n \sin(n\omega t + (n-1)\delta_4) + \\ \sum_{n=5,11,17...}^{\infty} I_n \sin(n\omega t + (n+1)\delta_4) \end{pmatrix}$$

$$i'_{ac2} = \frac{1}{m}\begin{pmatrix} \sum_{n=1,7,13...}^{\infty} I_n \sin(n(\omega t + \delta_5) - \delta_5) + \\ \sum_{n=5,11,17...}^{\infty} I_n \sin(n(\omega t + \delta_5) + \delta_5) \end{pmatrix}$$ [Equation 16]

$$= \frac{1}{m}\begin{pmatrix} \sum_{n=1,7,13...}^{\infty} I_n \sin(n\omega t + (n-1)\delta_5) + \\ \sum_{n=5,11,17...}^{\infty} I_n \sin(n\omega t + (n+1)\delta_5) \end{pmatrix}$$

Whereby 'a' current may be defined by the following equation 17, where 35th harmonic is the greatest except for the fundamental wave.

$$i_a = i'_{aa1} + i'_{aa2} + i'_{ab1} + i'_{ab2} + i'_{ac1} + i'_{ac2}$$

In general, as an order of harmonics increases, the size of the harmonics decreases, such that although the 17th harmonic is the greatest harmonic in the conventional inverter, the 35th harmonic is the greatest in the present disclosure, whereby it can be noted that the THD is improved.

As apparent from the foregoing, the THD of an input phase current can be mitigated according to the present disclosure, because a phase angle of a phase shift transformer in a medium voltage inverter is designed in consideration of a total number of unit power cells.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

What is claimed is:

1. A method for determining phase angle in phase shift transformer for medium voltage inverter, the inverter including a plurality of unit power cells formed in first and second stages, one stage formed with 3-phase unit power cells, and the plurality of unit power cells respectively connected to the phase shift transformer, the method comprising:

selecting an arbitrary phase shift angle and phase angle relative to a unit power cell of the first stage;

determining a phase angle displacement in consideration of the phase shift angle and the number of unit power cells connected to each phase of a motor;

determining a phase angle of the unit power cell at the second stage using a phase angle of the unit power cell at the first stage; and adjusting a phase angle when the determined phase angle of the unit power cell at the second stage exceeds a predetermined phase angle.

2. The method of claim 1, wherein the predetermined phase angle is 30° at the maximum.

3. The method of claim 1, wherein the adjustment of the phase angle is performed by using the following Equation $$, X'n = \text{sgn}(Xn)\frac{6|Xn| - 360}{6},$$

where X'n is an adjusted phase angle of the unit power cell, Xn is a phase angle of the unit power cell (n is positive integer), and sgn(Xn) is a function determining a sign, where when $$\frac{6|Xn| - 360}{6}$$

is positive, '1' is outputted and when $$\frac{6|Xn|-360}{6}$$

is negative '−1' is outputted.

4. The method of claim 1, wherein the phase angle displacement is a value in which the phase shift angle of the unit power cells in the first stage is divided by the number of unit power cells connected to each phase of the motor.

5. The method of claim 1, wherein the phase angle of the plurality of unit power cells is individually determined relative to each unit power cell.

* * * * *